United States Patent
Son et al.

(10) Patent No.: US 11,941,221 B2
(45) Date of Patent: Mar. 26, 2024

(54) TOUCH SENSOR HAVING WIRING OVERLAPPING PART

(71) Applicant: DONGWOO FINE-CHEM CO., LTD., Iksan-si (KR)

(72) Inventors: Dongjin Son, Asan-si (KR); Junha Kim, Pyeongtaek-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 18/040,926

(22) PCT Filed: Aug. 4, 2021

(86) PCT No.: PCT/KR2021/010243
§ 371 (c)(1),
(2) Date: Feb. 7, 2023

(87) PCT Pub. No.: WO2022/035122
PCT Pub. Date: Feb. 17, 2022

(65) Prior Publication Data
US 2023/0297202 A1    Sep. 21, 2023

(30) Foreign Application Priority Data
Aug. 10, 2020 (KR) .......................... 10-2020-0100093

(51) Int. Cl.
G06F 3/044    (2006.01)
G06F 3/041    (2006.01)

(52) U.S. Cl.
CPC .......... G06F 3/0448 (2019.05); G06F 3/0412 (2013.01)

(58) Field of Classification Search
CPC .............................. G06F 3/0448; G06F 3/0412
USPC ......................................................... 345/173
See application file for complete search history.

(56) References Cited

U.S. PATENT DOCUMENTS

| | | | | |
|---|---|---|---|---|
| 5,364,718 A | * | 11/1994 | Oae | G03F 7/2022 430/394 |
| 11,215,923 B1 | * | 1/2022 | Pai | G03F 7/0035 |
| 2021/0157448 A1 | * | 5/2021 | Tsai | G06F 3/0443 |

FOREIGN PATENT DOCUMENTS

| | | |
|---|---|---|
| JP | 05-136020 A | 6/1993 |
| JP | 2007-103723 A | 4/2007 |
| JP | 2010-98095 A | 4/2010 |
| KR | 10-2000-0027743 A | 5/2000 |
| KR | 2000027743 A * | 5/2000 |

(Continued)

OTHER PUBLICATIONS

International Search Report for PCT/KR2021/010243 dated Nov. 11, 2021.

*Primary Examiner* — Mark Edwards
(74) *Attorney, Agent, or Firm* — Sughrue Mion, PLLC

(57) ABSTRACT

A touch sensor includes a sensing part in which a plurality of sensing cells is arranged and connected and a wiring part connected to the sensing part and formed outside the sensing part. The wiring part includes a first divisional wiring part having a plurality of first divisional wires having a connecting protrusion with a width larger than that of the wiring at one end thereof and a second divisional wiring part having a plurality of second divisional wires having one end thereof with a width smaller than that of the connecting protrusion and coupled to and overlapped with the connecting protrusion. The first divisional wiring part and the second divisional wiring part are formed by divisional exposure.

6 Claims, 8 Drawing Sheets

(56) References Cited

FOREIGN PATENT DOCUMENTS

| KR | 10-2010-0059107 A | | 6/2010 |
|----|-------------------|---|--------|
| KR | 10-1068285 B1 | | 9/2011 |
| KR | 10-2016-0079281 A | | 7/2016 |
| KR | 2016079281 A | * | 7/2016 |

* cited by examiner

[Figure 1]
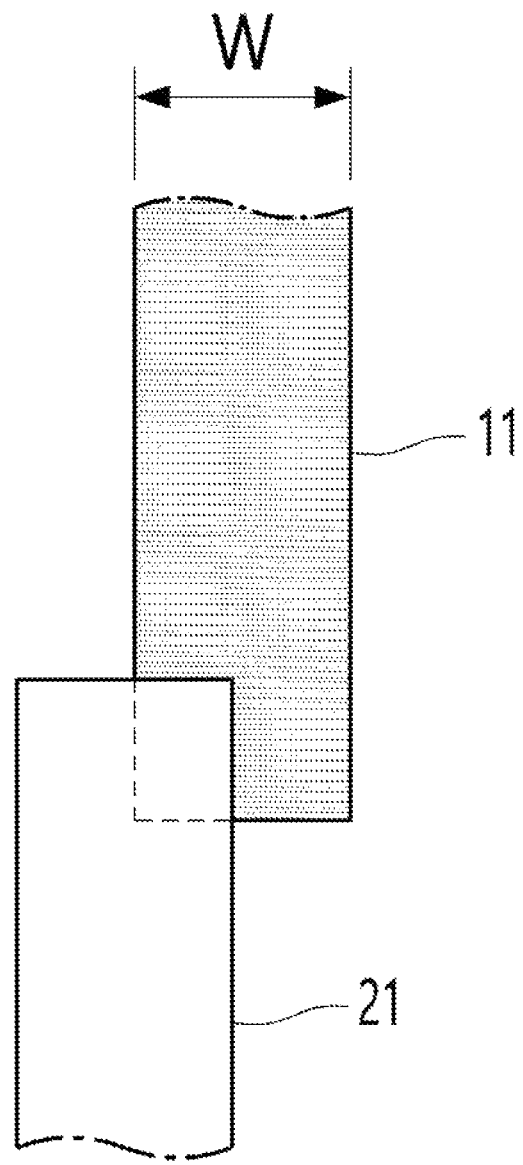

[Figure 2]
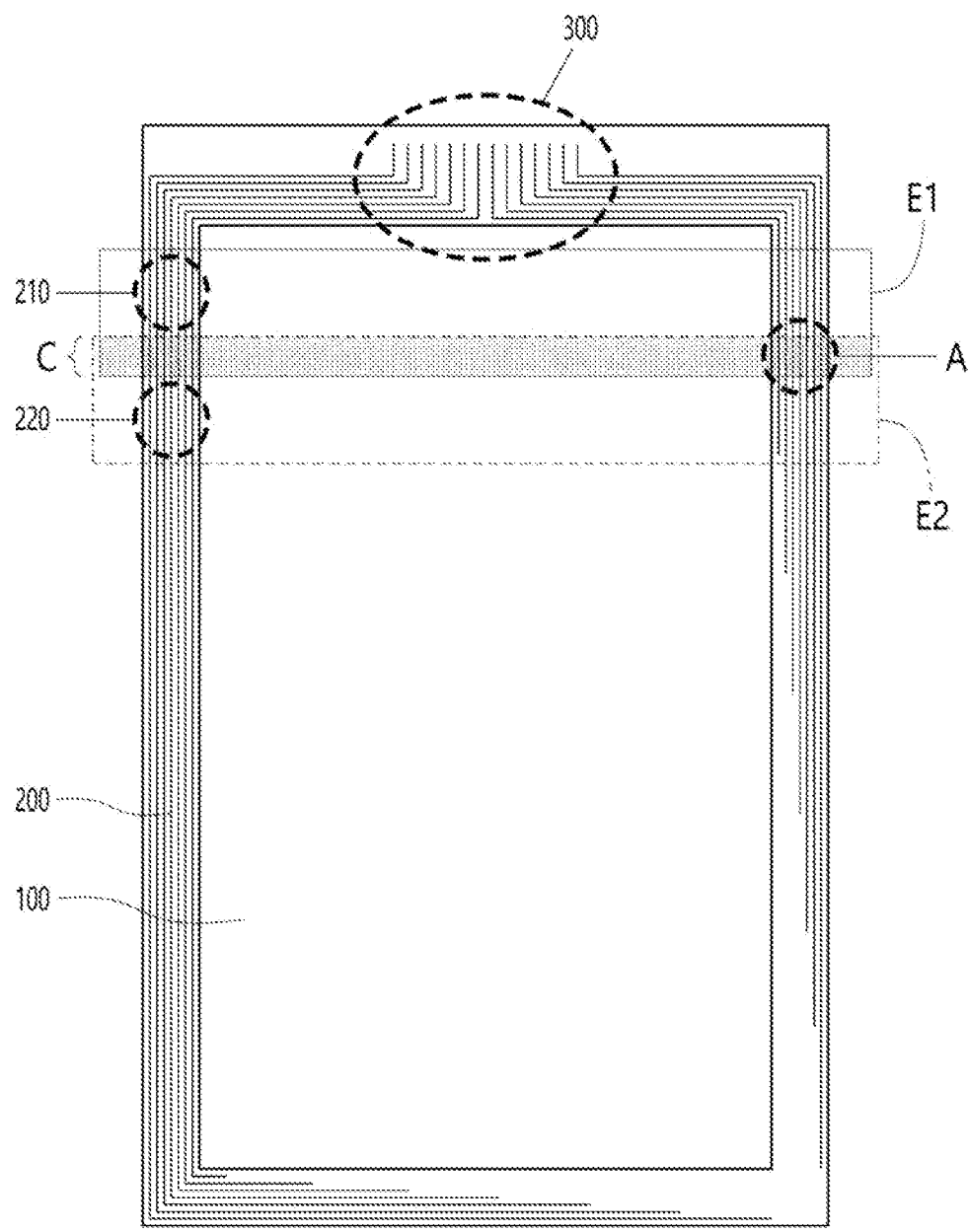

【Figure 3A】
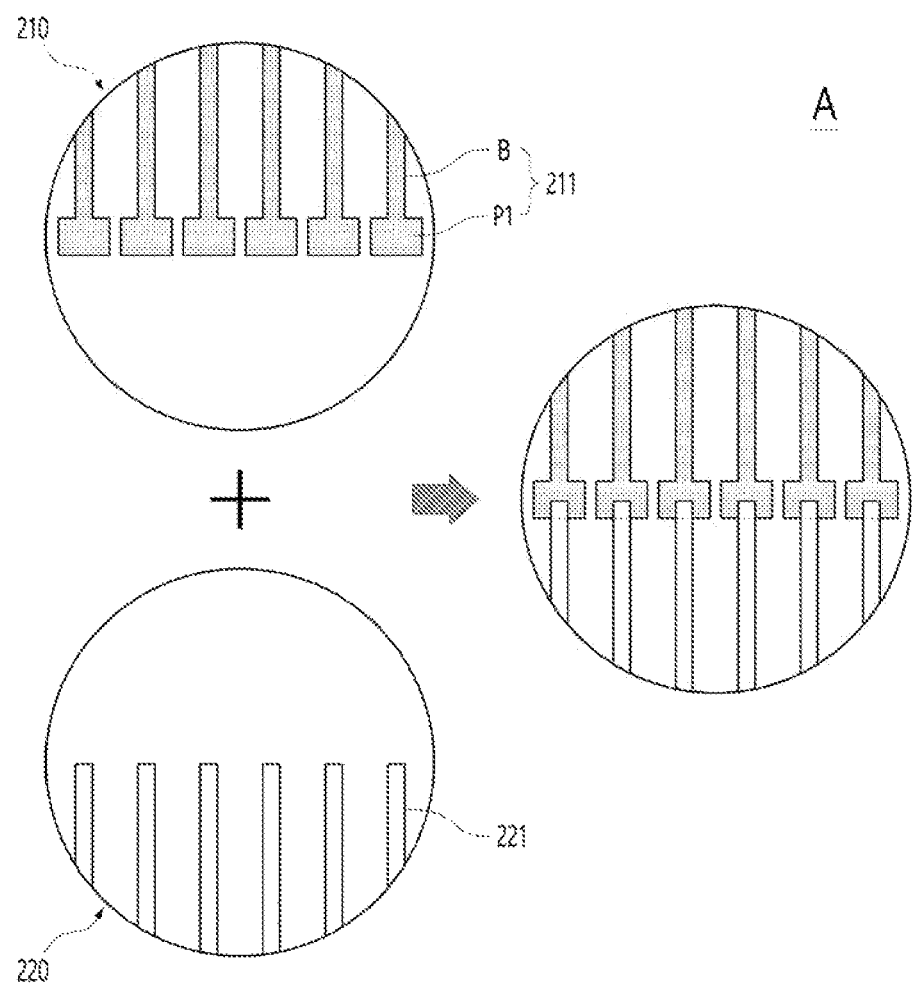

【Figure 3B】
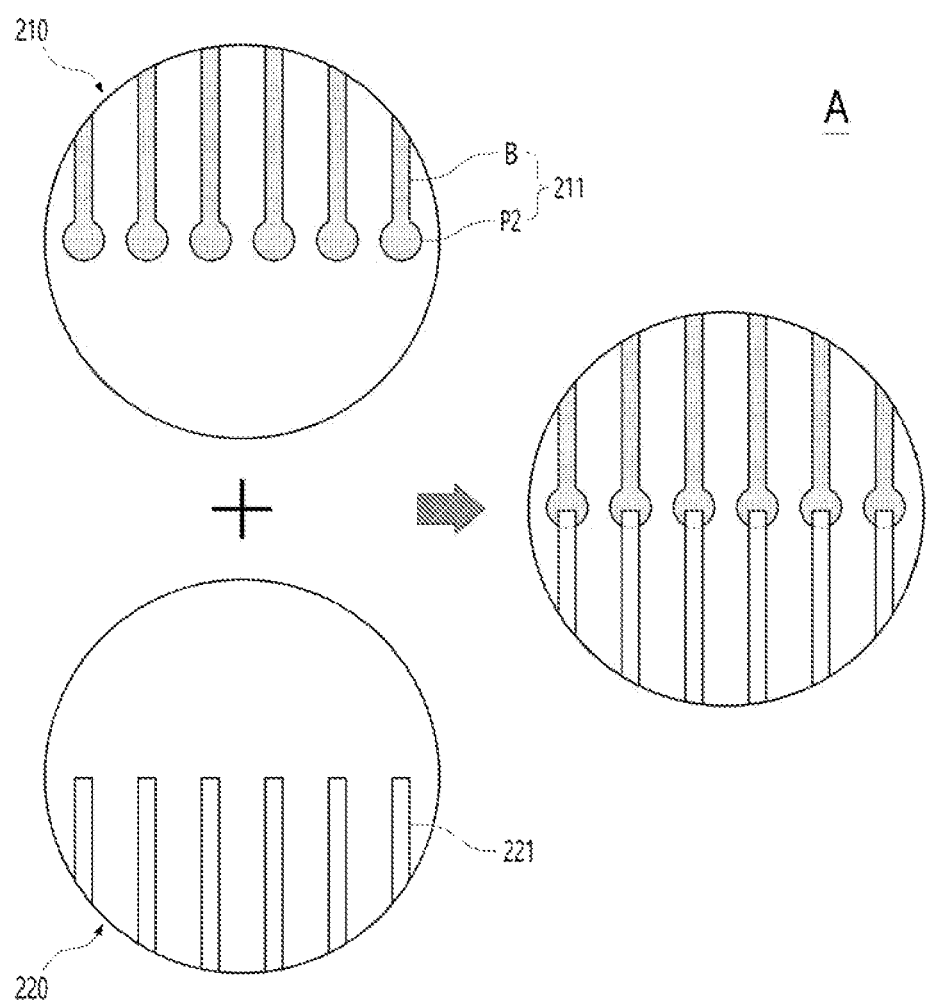

[Figure 3C]
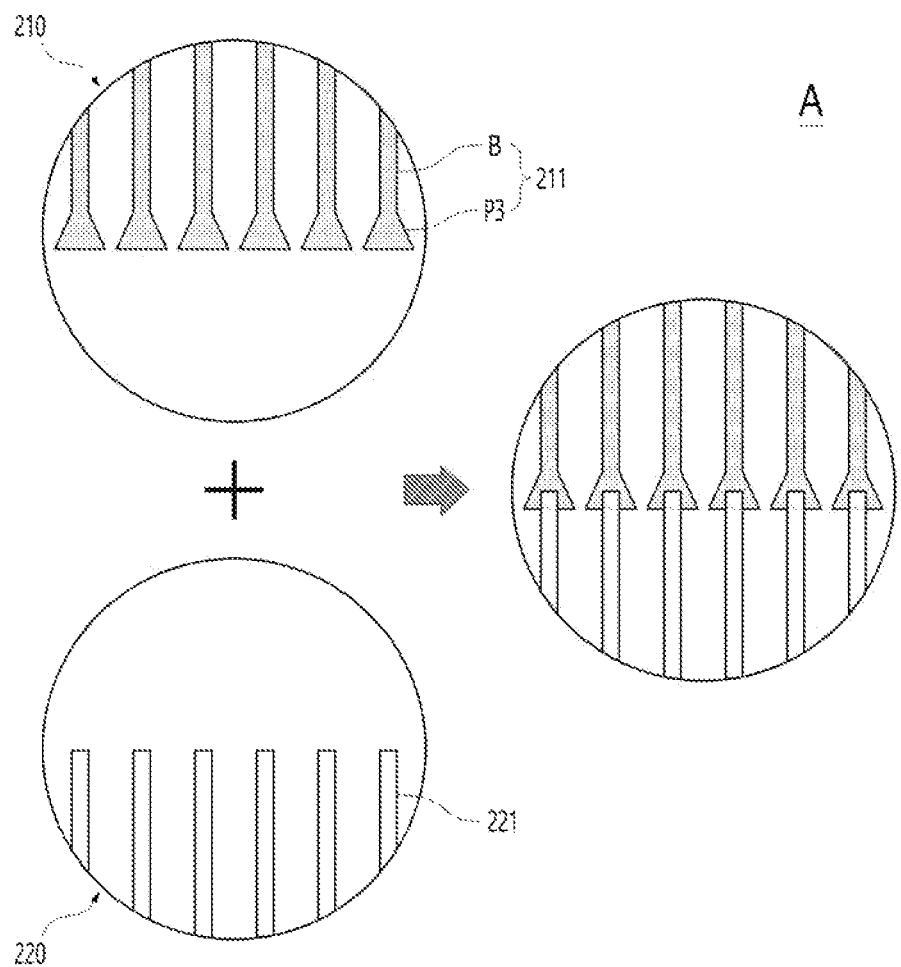

【Figure 3D】
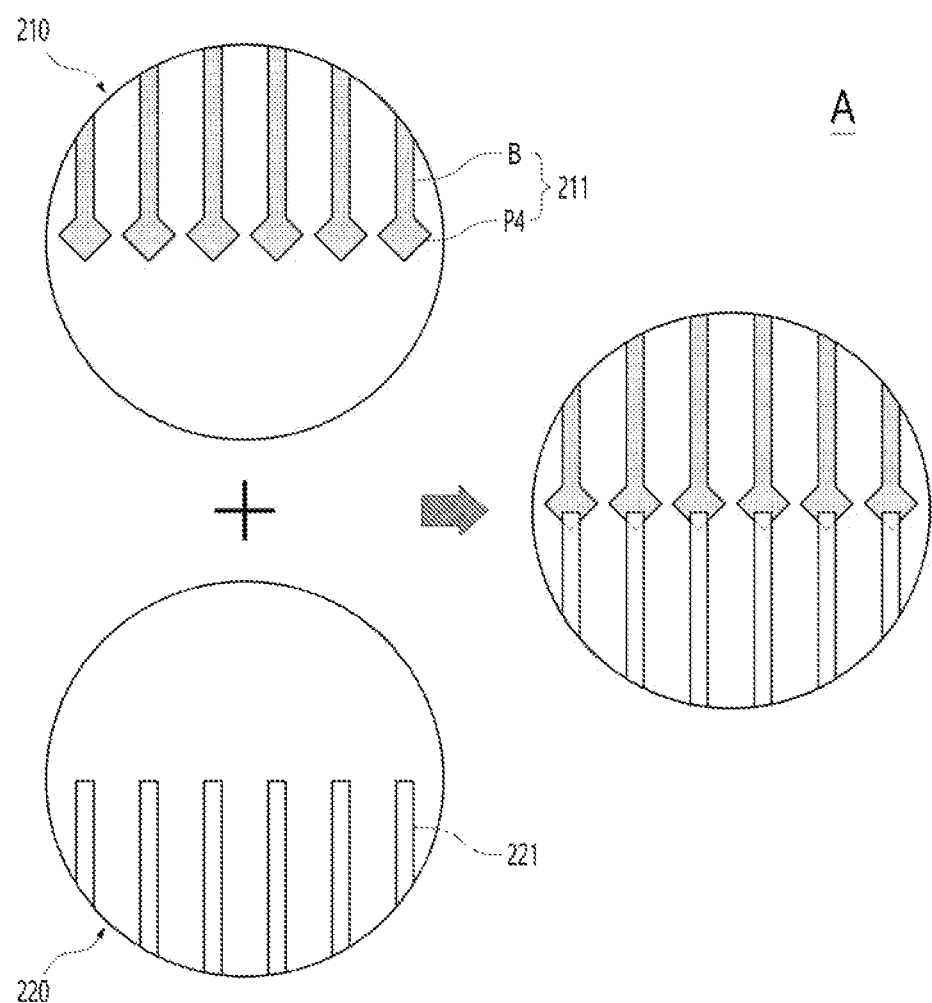

[Figure 3E]
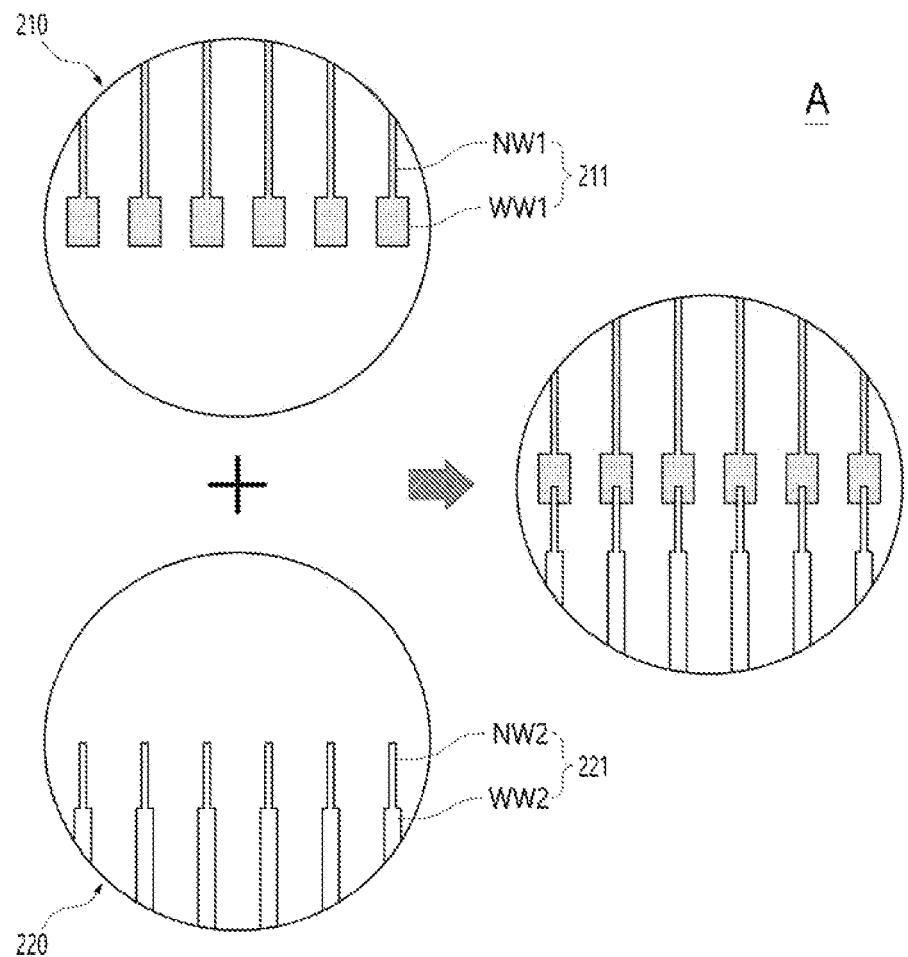

[Figure 4]
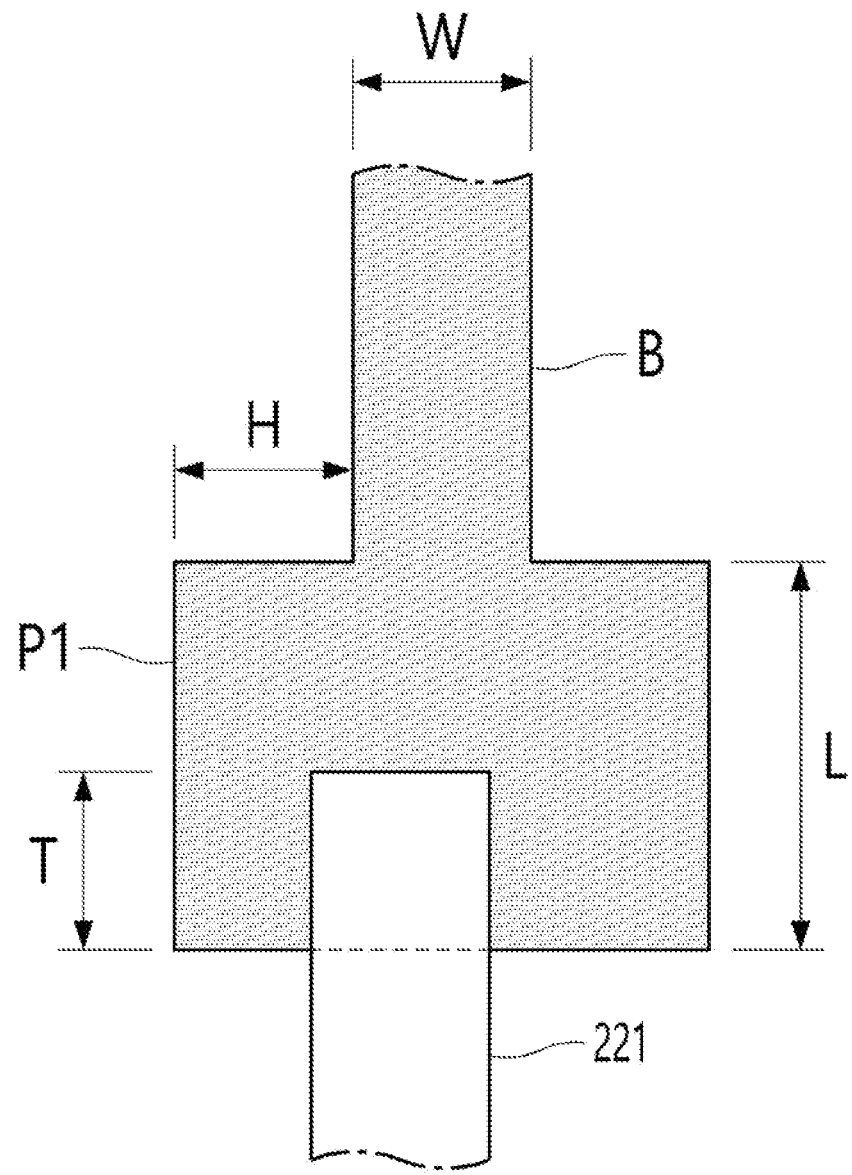

TOUCH SENSOR HAVING WIRING OVERLAPPING PART

This Application is a National Stage of International Application No. PCT/KR2021/010243 filed Aug. 4, 2021, claiming priority based on Korean Patent Application No. 10-2020-0100093 filed Aug. 10, 2020, the contents of all of which are incorporated herein by reference in their entirety.

TECHNICAL FIELD

The present invention relates to a touch sensor. Particularly, the present invention relates to a touch sensor having overlapped wiring formed by divisional exposure.

BACKGROUND ART

A touch sensor is an input device that receives a touch command. There are a resistive type, a capacitive type, an ultrasonic type, an infrared type, and so on, according to the sensing method of a touch part. Recently, the capacitive type is mainly used.

The capacitive type uses a transparent substrate on which a conductive thin film is formed. In the capacitive type, when a user touches a surface of a transparent substrate with a certain amount of voltage maintained on the surface of the transparent substrate, the voltage changes at the contact surface. The capacitive type detects the change in voltage to sense whether it is touched.

A touch sensor includes a sensing part, a wiring part, etc.

The sensing part detects a contact location and includes a plurality of sensing cells. The sensing cells are composed of rhombuses, etc., and are arranged and connected in X and Y axes on a transparent substrate.

One end of the wiring part is connected to the sensing cells arranged in X and Y axes and the other end is connected to an electrode pad part so that the sensing signal of the sensing part may be transmitted to the outside, for example, FPCB.

Recently, as the demand for large-area touch sensors increases, a divisional exposure method using a divisional mask, a so-called stitch method, is widely used to implement a large-area touch sensor.

Korean Patent Registration No. 1068285 (Liquid crystal display exposure mask pattern and exposure method) exemplifies the stitch method. In detail, the method includes dividing a sub-pixel into a first exposure area and a second exposure area in an array substrate of a liquid crystal display, and sequentially step-exposing the first exposure area and the second exposure area. The first exposure area and the second exposure area divided in sub-pixels are lego patterns divided into two or more. The sub-pixels that are divided into the first exposure area and the second exposure area for exposure are composed of sub-pixels in an overlapping exposure area during divisional exposure.

However, in an exposure method such as Korean Patent Registration No. 1068285, when forming a fine pattern such as a wiring area, wiring may not be connected to each other and disconnected in an overlapping area between divisional exposures. In particular, as the width of the wiring is reduced according to the pursuit of high resolution, the disconnection problem is increasing.

FIG. 1 is a partially enlarged view illustrating overlapped wiring of a touch sensor according to the prior art.

As shown in FIG. 1, when the second divisional wire 21 is formed by the second divisional exposure on the first divisional wire 11 formed by the first divisional exposure, the second divisional wire 21 may be shifted in the line width direction, and non-overlapping areas may occur. In this case, as the size of the overlapping area decreases, resistance at the overlapped wiring increases, and as a result, performance of the touch sensor may deteriorate.

DISCLOSURE OF INVENTION

Technical Problem

The present invention is to solve the above problems of the prior art and an object of the present invention is to provide a touch sensor capable of preventing or minimizing wiring disconnection in overlapping areas of divisional exposure.

Another object of the present invention is to provide a touch sensor capable of preventing or minimizing the occurrence of a short circuit between adjacent wires due to process errors.

Yet another object of the present invention is to provide a touch sensor that can be easily applied to a large-area implementation.

Technical Solution

A touch sensor of the present invention to achieve such objects may include a sensing part, a wiring part, and so on.

The sensing part may include a plurality of sensing cells arranged and connected.

The wiring part may be connected to the sensing part and formed outside the sensing part. The wiring part may include a first divisional wiring part and a second divisional wiring part formed by divisional exposure.

The first divisional wiring part may have a plurality of first divisional wires having a connecting protrusion with a width larger than that of the wiring at one end thereof.

The second divisional wiring part may have a plurality of second divisional wires having one end thereof with a width smaller than that of the connecting protrusion and coupled to and overlapped with the connecting protrusion.

In the touch sensor of the present invention, the connecting protrusion may have a square shape. The connecting protrusion of the square shape may have a width of 5 to 20 μm and a length of 20 to 40 μm.

In the touch sensor of the present invention, the connecting protrusion may have a circle, triangle, or rhombus shape.

In the touch sensor of the present invention, the first divisional wiring part may have a plurality of first divisional wires having a wide-width wire having a width larger than that of the wiring at one end thereof. The second divisional wiring part may have a plurality of second divisional wires having a narrow-width wire having a width smaller than that of the wiring and coupled to and overlapped with the wide-width wire at one end thereof.

In the touch sensor of the present invention, the wide-width wire and the narrow-width wire may have a square shape.

The touch sensor according to the present invention may constitute a part of a window laminate by combining a window layer on one surface.

The touch sensor according to the present invention may constitute a part of an image display device by combining a display panel on one surface.

Advantageous Effects

In the present invention having such a configuration, a connecting protrusion having a larger width than the wiring is formed at one end of the wiring formed by the first divisional exposure, so that one end of the wiring formed by the second divisional exposure can be easily overlapped and connected to the connecting protrusion. Through this, the present invention can prevent or minimize wiring disconnection in the overlapping area of divisional exposure.

According to the present invention, by optimizing the width and length of the connecting protrusion in consideration of the process error of the first divisional exposure and the second divisional exposure, it is possible to prevent or minimize short circuits between adjacent wires due to process errors. Further, an increase in resistance due to a decrease in overlapping (contact) area may be blocked or minimized.

In addition, the present invention allows to pattern a large-area touch sensor by repeatedly using a small-area exposure mask having a predetermined pattern. As a result, the present invention can be easily applied to form a large-area touch sensor. In addition, the present invention does not need to manufacture or purchase a relatively expensive large-area mask, and thus the manufacturing cost can be significantly reduced.

DESCRIPTION OF DRAWINGS

FIG. 1 is a partially enlarged view illustrating overlapped wiring of a touch sensor according to the prior art.

FIG. 2 is a plan view illustrating a touch sensor having overlapped wiring according to the present invention.

FIGS. 3A to 3E are partially enlarged views illustrating shapes of overlapped wiring in a touch sensor according to the present invention.

FIG. 4 is a partially enlarged view illustrating an overlapping margin of overlapped wiring in a touch sensor according to the present invention.

BEST MODE

Hereinafter, the present invention will be described in more detail with reference to the accompanying drawings.

FIG. 2 is a plan view illustrating a touch sensor having overlapped wiring according to the present invention.

As shown in FIG. 2, the touch sensor having overlapped wiring according to the present invention may include a sensing part 100, a wiring part 200, an electrode pad part 300, and so on.

The sensing part 100 may include a plurality of sensing cells. The sensing cells may be arranged in X-axis and Y-axis directions and electrically connected. The sensing cell can be configured in the form of an island. The electrical connection between the sensing cells may be patterned together with the sensing cells or through bridges in a separate process.

The sensing part 100 may be composed of a transparent conductive oxide, for example, conductive oxides such as indium tin oxide (ITO), indium zinc oxide (IZO), aluminum zinc oxide (AZO), zinc oxide (ZnOx), titanium oxide (TiO$_2$), aluminum oxide (Al$_2$O$_3$). In addition, indium zinc tin oxide (IZTO), indium oxide (InOx), tin oxide (SnOx), cadmium tin oxide (CTO), gallium-doped zinc oxide (GZO), zinc tin oxide (ZTO), indium gallium oxide (IGO) or the like, or a combination of two or more thereof may also be used. The sensing part 100 may be composed of a conductive metal, a laminate of an oxide and a metal, or the like. It may be desirable to configure the conductive metal in a mesh type in order to increase transparency.

The wiring part 200 may be formed outside the sensing part 100. The wiring part 200 may include a plurality of wires. One side of the wiring part 200 is connected to the sensing part 100 and the other side is connected to the electrode pad part 300, so that a sensing signal of the sensing part 100 may be transmitted to the electrode pad part 300.

As shown in FIG. 2, the wiring part 200 may be disposed on the outside of the sensing part 100 as a whole, that is, on the sides, front and rear. Alternatively, the wiring part 200 may be disposed only on both sides and the front side of the sensing part 100 (an area where the electrode pad part 300 is formed) or only on one side and the front side of the sensing part 100.

The wiring part 200 may be composed of a conductive metal, for example, silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), or an alloy thereof (e.g., silver-palladium-copper (APC)).

The wiring part 200 may be formed by divisional exposure. As shown in FIG. 2, the divisional exposure may include a plurality of exposure areas such as a first exposure area E1, a second exposure area E2, and the like. The first exposure area E1 and the second exposure area E2 may be exposed with overlapping boundary areas. As a result, there may be an overlapping exposure area C at the boundary between the first exposure area E1 and the second exposure area E2.

The wiring part 200 may include a first divisional wiring part 210 and a second divisional wiring part 220 due to the divisional exposure.

The first divisional wiring part 210 may include a plurality of first divisional wires 211 formed by first exposure. The first divisional wire 211 is a part of the wiring, and one end thereof may be connected to an adjacent divisional wire formed by subsequent divisional exposure.

The second divisional wiring part 220 may include a plurality of second divisional wires 221 formed by second exposure. The second divisional wire 221 is a part of the wiring, and front and rear ends thereof may be connected to front and rear adjacent divisional wires formed by previous divisional exposure and subsequent divisional exposure, respectively.

The electrode pad part 300 transmits a sensing signal received from the wiring part 200 to an FPCB (not shown), and may include a plurality of electrode pads.

One side of the FPCB (not shown) may be connected to the electrode pad part 300 to directly process a sensing signal or transmit a sensing signal to a processor. The FPCB (not shown) may transmit a driving signal to the sensing part 100 through the electrode pad part 300.

The FPCB (not shown) may be adhered to the electrode pad part 300 using an adhesive containing a photocurable resin. As the adhesive, an anisotropic conducting film (ACF) having a plurality of conductive balls may be used.

FIGS. 3A to 3E are partially enlarged views illustrating shapes of overlapped wiring in a touch sensor according to the present invention.

FIG. 3A shows a first embodiment of overlapped wiring. As shown in FIG. 3A, the wiring part 200 may be formed by overlapping one end of a first divisional wiring part 210 formed by first exposure and one end of a second divisional wiring part 220 formed by second exposure.

The first divisional wiring part 210 may include a first divisional wire 211. The first divisional wire 211 may include a first wiring body B and a connecting protrusion P1.

The first wiring body B may have a width W of 30 to 50 µm, for example. The first wiring body B may be configured such that the spacing exceeds 20 µm in consideration of process errors (5 to 20 µm), etc.

The connecting protrusion P1 may have a larger width than the first wiring body B. Since process errors that occur when forming the wiring are at least 5 µm and at most 20 µm, it may be preferable to configure the lateral protrusion height H of the connecting protrusion P1 to be 5 µm to 20 µm.

The connecting protrusion P1 may have a square shape. In this case, it may be desirable to configure the length of the connecting protrusion P1 to be greater than the maximum process error in consideration of process errors. In this case, it may be desirable to make it double the maximum process error in consideration of a short circuit with lateral wiring and an increase in resistance due to longitudinal shifting. As such, the length of the connecting protrusion P1 may be configured to be 20 to 40 µm.

The second divisional wiring part 220 may include a second divisional wire 221. The second divisional wire 221 may be configured to have a normal size of wiring, that is, a width W of 30 to 50 µm.

Since the second divisional wire 221 has a smaller width than the connecting protrusion P1 of the first divisional wire 211 and overlaps the connecting protrusion P1, it may be advantageous in mitigating the risk of non-overlap (adjacent wiring short circuit, resistance increase, etc.) due to process errors (side shifting).

FIG. 3B shows a second embodiment of overlapped wiring. As illustrated in FIG. 3B, a connecting protrusion P2 of a first divisional wire 211 may be formed in a circular shape. In this case, the circular connecting protrusion P2 may have a lateral protrusion height H of 5 to 20 µm and a length L of 20 to 40 µm. However, since the non-overlapping area (size) increases rapidly compared to the rectangular connecting protrusion P1 when the wiring is shifted laterally, it may be preferable to configure the lateral protrusion height H and length L of the circular connecting protrusion P2 larger than the case of the rectangular connecting protrusion P1.

Since the remaining components of FIG. 3B are the same as the corresponding components of FIG. 3A, detailed descriptions of the remaining components will be replaced with the related description of FIG. 3A.

FIG. 3C shows a third embodiment of overlapped wiring. As illustrated in FIG. 3C, a connecting protrusion P3 of a first divisional wire 211 may be formed in a triangular shape. In this case, the triangular connecting protrusion P3 may have a lateral protrusion height H of 5 to 20 µm and a length L of 20 to 40 µm. However, since the non-overlapping area rapidly increases similarly to a circular shape when the wiring is shifted, it may be desirable that the lateral protrusion height H and length L of the triangular connecting protrusion P3 are formed to be larger than those of the rectangular connecting protrusion P1.

Since the remaining components of FIG. 3C are the same as the corresponding components of FIG. 3A, detailed descriptions of the remaining components will be replaced with the related description of FIG. 3A.

FIG. 3D shows a fourth embodiment of overlapped wiring. As illustrated in FIG. 3D, a connecting protrusion P4 of a first divisional wire 211 may be formed in a rhombic shape. In this case, the rhombic connecting protrusion P4 may have a lateral protrusion height H of 5 to 20 µm and a length L of 20 to 40 µm. However, since the non-overlapping area increases similarly to a circle or a triangle when the wiring is shifted, it may be desirable that the lateral protrusion height H and length L of the rhombic connecting protrusion P4 are also larger than those of the rectangular connecting protrusion P1.

Since the remaining components of FIG. 3D are the same as the corresponding components of FIG. 3A, detailed descriptions of the remaining components will be replaced with the related description of FIG. 3A.

FIG. 3E shows a fifth embodiment of overlapped wiring. As shown in FIG. 3E, a first divisional wire 211 may include a first wide-width wire WW1 having a larger width than the wiring on one side. The first wide-width wiring WW1 may be formed in a rectangular shape. The lateral protruding height H of the first wide-width wiring WW1 may be 5 to 20 µm in consideration of process errors. The length L may be configured to be 40 µm or more. In the first divisional wire 211, the remaining wire portion other than the first wide-width wire WW1 may have the same width as the normal wiring or may be composed of a first narrow-width wire NW1 having a smaller width than the normal wiring.

In FIG. 3E, a second divisional wire 221 may include a second narrow-width wire NW2 overlapped and coupled to the first wide-width wire WW1 of the first divisional wire 211. The second narrow-width wire NW2 may have a rectangular shape. The second narrow-width wire NW2 may have the same width as the normal wiring or may have a smaller width than the normal wiring. In the second divisional wire 221, the remaining wire portion other than the second narrow-width wire NW2 may be configured to have the same width as the normal wiring or may be configured as a second wide-width wire WW2 having a wider width than the normal wiring.

Since the remaining components of FIG. 3E are the same as the corresponding components of FIG. 3A, detailed descriptions of the remaining components will be replaced with the related description of FIG. 3A.

FIG. 4 is a partially enlarged view illustrating an overlapping margin of overlapped wiring in a touch sensor according to the present invention.

As shown in FIG. 4, when a connecting protrusion P1 of a first divisional wire 211 formed by first divisional exposure is formed to have a width larger than that of the normal wiring, a lateral shift margin may be increased when one end of a second divisional wire 221 formed by second divisional exposure overlaps. Here, when the lateral protrusion height H of the connecting protrusion P1 is formed to be 20 µm in consideration of the maximum value of the process error occurring when forming the wiring part, the occurrence of a non-overlapping area between the first divisional wire 211 and the second divisional wire 221 may be fundamentally blocked or minimized even if the second divisional wire 221 is shifted due to the process error (lateral shift).

Meanwhile, when the connecting protrusion P1 of the first divisional wire 211 formed by the first divisional exposure is formed to have a length greater than 20 µm, which is the maximum value of the process error, it is possible to secure at least 20 µm of the overlapping length T of the connecting protrusion P1 and one end of the second divisional wire 221 formed by the second divisional exposure. Accordingly, even if the second divisional wire 221 is shifted laterally by 20 µm, which is the maximum value of the process error, the second divisional wire 221 may overlap the first divisional wire 211 in an area of up to 20×20 µm. As a result, an increase in resistance caused by non-overlapping of the first divisional wire 211 and the second divisional wire 221 may be blocked or minimized. Furthermore, considering the case where the second divisional wire 221 is shifted in the longitudinal direction up to 20 μm, which is the maximum value of the process error, it may be preferable to configure the length L of the connecting protrusion P1 to be up to 40 μm.

A touch sensor having overlapped wiring according to the present invention may constitute a part of a window laminate by combining a window layer on one surface. Here, the window layer may include a transparent film, a polarization layer, a decorative layer, and the like.

A touch sensor having overlapped wiring according to the present invention may constitute a part of an image display device by combining a display panel on one surface. Here, the display panel may include a liquid crystal display panel, a plasma panel, an electroluminescence panel, an organic light emitting diode panel, and the like.

Although particular embodiments of the present invention have been shown and described, it will be understood by those skilled in the art that it is not intended to limit the present invention to the preferred embodiments, and it will be obvious to those skilled in the art that various changes and modifications may be made without departing from the spirit and scope of the invention.

The scope of the present invention, therefore, is to be defined by the appended claims and equivalents thereof.

| [Description of reference numerals] | |
|---|---|
| 100: sensing part | 200: wiring part |
| 210: first divisional wiring part | 211: first divisional wire |
| 220: second divisional wiring part | 221: second divisional wire |
| 300: electrode pad part | E1: first exposure area |
| E2: second exposure area | C: overlapping exposure area |
| B: wiring body | P1~P4: connecting protrusion |
| NW1: first narrow-width wire | NW2: second narrow-width wire |
| WW1: first wide-width wire | WW2: second wide-width wire |
| W: wiring width | H: lateral protrusion height of connecting protrusion |
| L: length of connecting protrusion | T: overlapping length |

The invention claimed is:

1. A touch sensor having overlapped wiring comprising:
a sensing part in which a plurality of sensing cells is arranged and connected; and
a wiring part connected to the sensing part and formed outside the sensing part, wherein the wiring part comprises:
a first divisional wire; and
a second divisional wire formed by divisional exposure while overlapping the first divisional wire,
wherein
the first divisional wire includes a first wiring body, and a first connecting protrusion connected to one end of the first wiring body and having a width wider than that of the first wiring body, and
one end of the second divisional wire has a width narrower than that of the first connecting protrusion and is coupled to and overlapped with the first connecting protrusion, and
wherein
the first wiring body is spaced apart from each other in excess of 20 μm, and
the first connecting protrusion has a rectangular shape and protrudes in a width direction from both sides of the first wiring body by 5 to 20 μm respectively, and extends in a longitudinal direction from one end of the first wiring body by 20 to 40 μm.

2. A window laminate comprising:
the touch sensor having overlapped wiring according to claim 1; and
a window layer coupled to one surface of the touch sensor.

3. An image display device comprising:
the touch sensor having overlapped wiring according to claim 1; and
a display panel coupled to one surface of the touch sensor.

4. A touch sensor having overlapped wiring comprising:
a sensing part in which a plurality of sensing cells is arranged and connected; and
a wiring part connected to the sensing part and formed outside the sensing part, wherein
the wiring part comprises:
a first divisional wire; and
a second divisional wire formed by divisional exposure while overlapping the first divisional wire,
wherein
the first divisional wire includes a first narrow-width wire, and a first wide-width wire connected to one end of the first narrow-width wire and having a width wider than that of the first narrow-width wire, and
the second divisional wire has a second wide-width wire and a second narrow-width wire connected to one end of the second wide-width wire and having a width narrower than those of the second wide-width wire and the first wide-width wire, and the second narrow-width wire is coupled to and overlapped with the first wide-width wire, and
wherein
the first narrow-width wire is spaced apart from each other in excess of 20 μm, and
the first wide-width wire has a rectangular shape and protrudes in a width direction from both sides of the first narrow-width wire by 5 to 20 μm respectively, and extends in a longitudinal direction from one end of the first narrow-width wire by 20 to 40 μm.

5. A window laminate comprising:
the touch sensor having overlapped wiring according to claim 4; and
a window layer coupled to one surface of the touch sensor.

6. An image display device comprising:
the touch sensor having overlapped wiring according to claim 4; and
a display panel coupled to one surface of the touch sensor.

* * * * *